United States Patent [19]
Garrison et al.

[11] 3,941,003
[45] Mar. 2, 1976

[54] BALANCED SICKLE DRIVE

[75] Inventors: Harold Keith Garrison; Cecil L. Case, both of Newton; Allen A. White, Peabody, all of Kans.

[73] Assignee: Hesston Corporation, Hesston, Kans.

[22] Filed: July 9, 1974

[21] Appl. No.: 486,775

[52] U.S. Cl. .................................... 74/44; 56/296
[51] Int. Cl.² .................................... F16H 21/22
[58] Field of Search ................ 56/296; 74/44, 25

[56] References Cited
UNITED STATES PATENTS

| | | | |
|---|---|---|---|
| 889,859 | 6/1908 | Robertson | 74/44 |
| 2,691,863 | 10/1954 | Krause | 56/296 |
| 2,808,696 | 10/1957 | Hall | 56/296 |
| 2,819,618 | 1/1958 | Slusher | 74/44 |
| 2,912,814 | 11/1959 | Witt et al. | 74/44 |
| 3,112,652 | 12/1963 | Freeborn | 74/44 |
| 3,215,260 | 11/1965 | Umbright et al. | 74/44 |
| 3,546,864 | 12/1970 | White | 56/296 |

Primary Examiner—Samuel Scott
Assistant Examiner—Wesley S. Ratliff, Jr.
Attorney, Agent, or Firm—Schmidt, Johnson, Harvey & Williams

[57] ABSTRACT

A sickle drive has a sway bar that is coupled with the sickle to reciprocate the latter during oscillation of the sway bar. The latter is operably coupled with a crank drive through a special linkage employing a pair of oppositely extending, short pitman links that compensate for one another adjacent opposite ends of the sickle stroke to vary the velocity of the sickle substantially sinusoidally. The oppositely directed inertia forces of the sickle adjacent opposite ends of its stroke, made equal by the special linkage, are balanced out by a pair of superimposed, oppositely rotating weights driven in timed relationship to reciprocation of the sickle, thereby presenting a substantially vibration-free drive.

19 Claims, 11 Drawing Figures

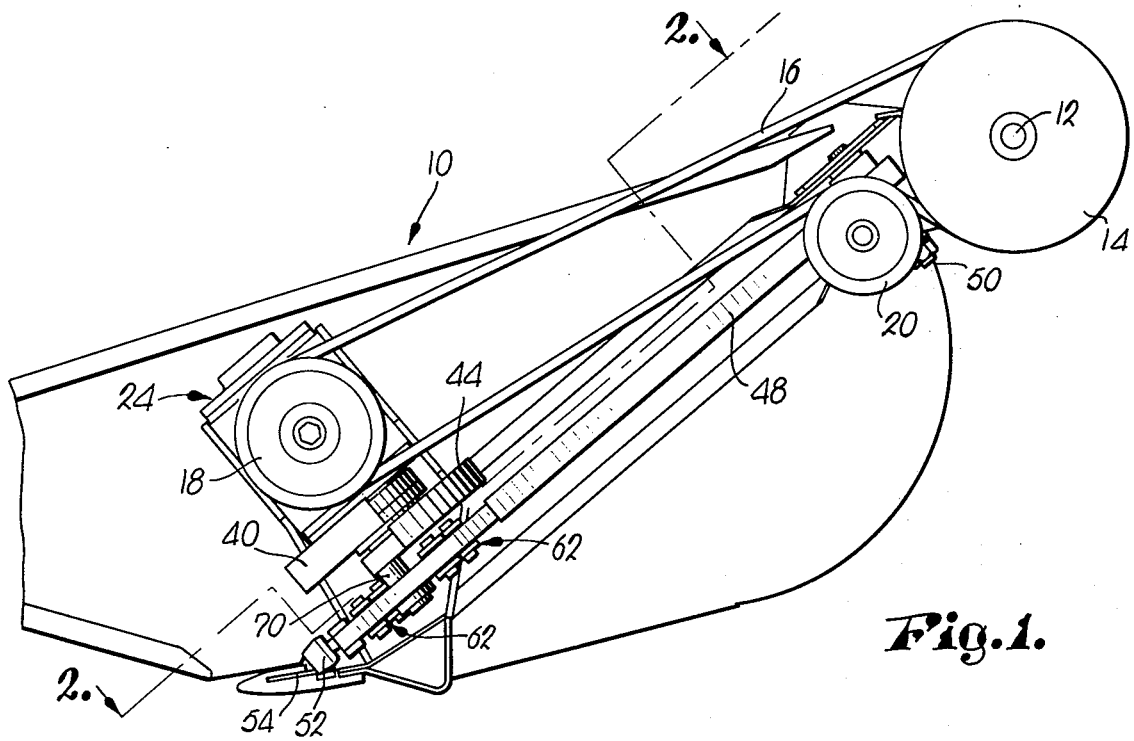
Fig.1.
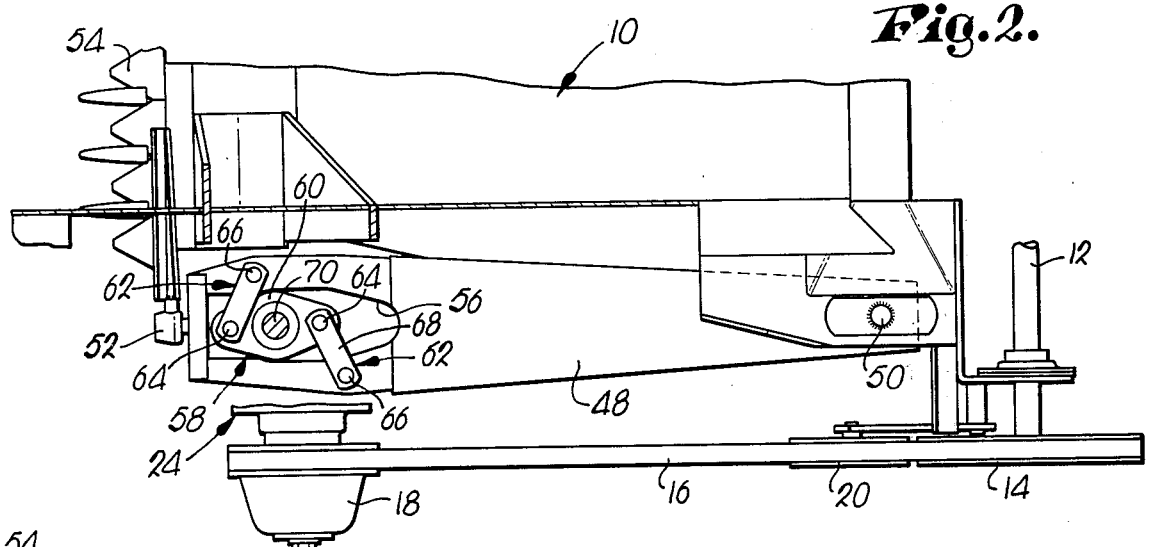
Fig.2.
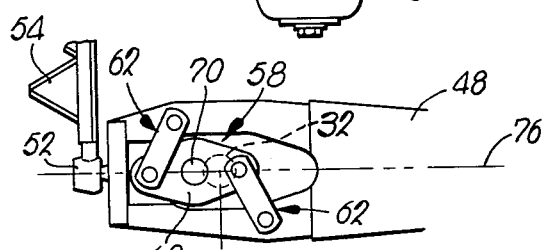
Fig.6.
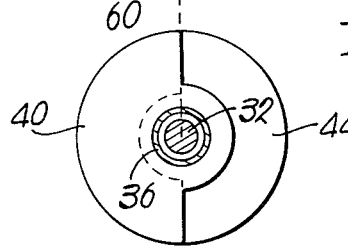
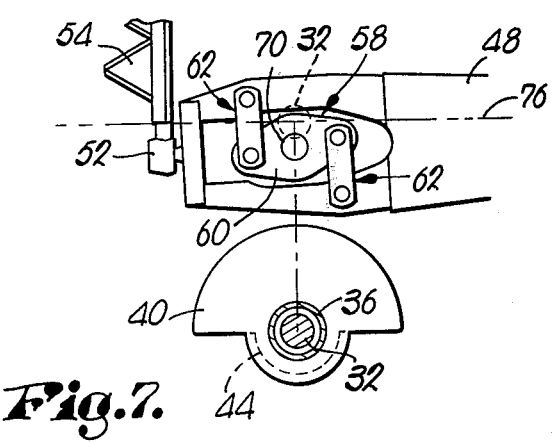
Fig.7.

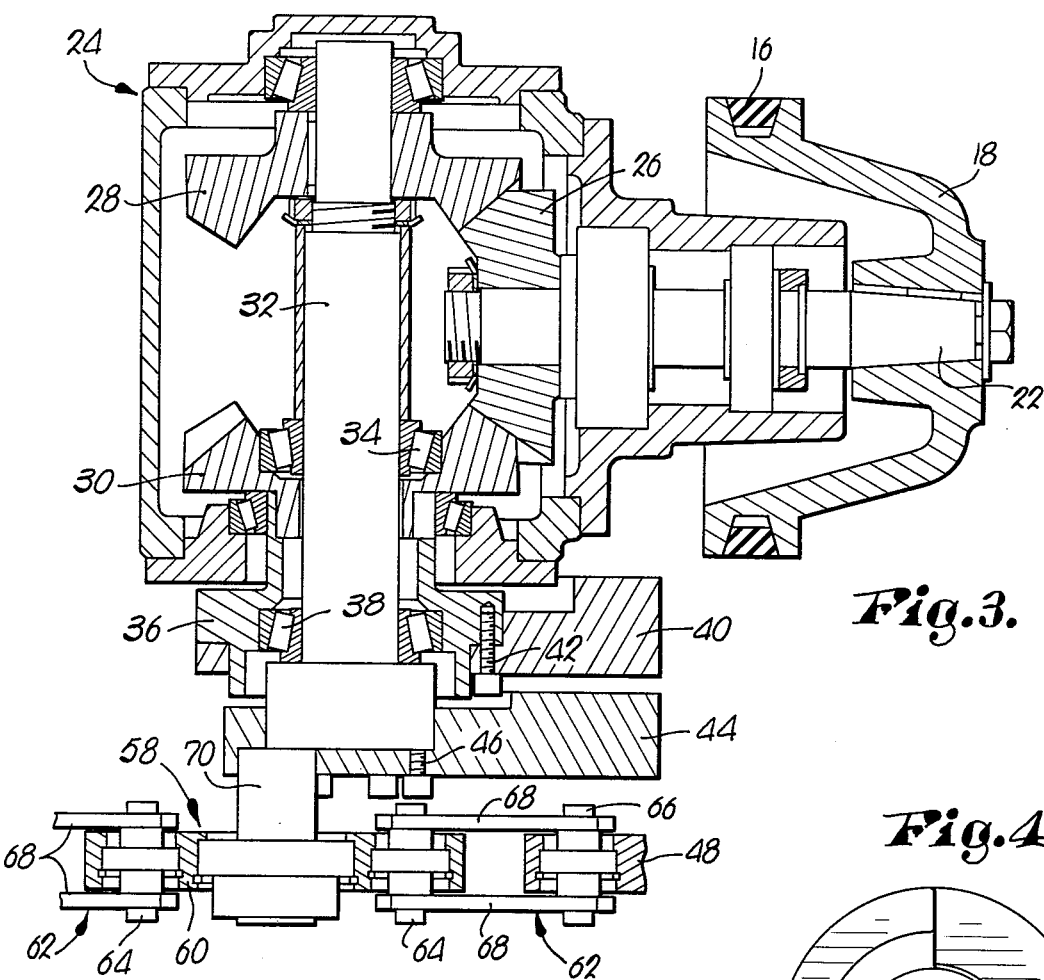
*Fig.3.*
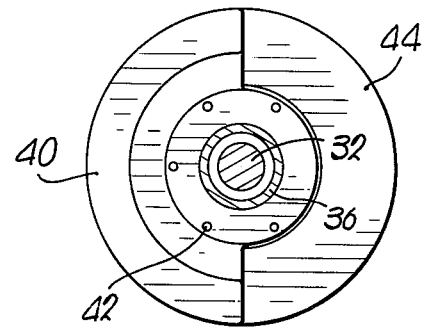
*Fig.4.*
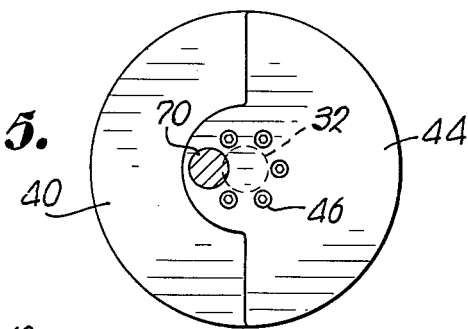
*Fig.5.*
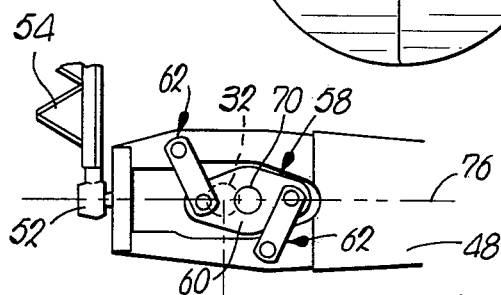
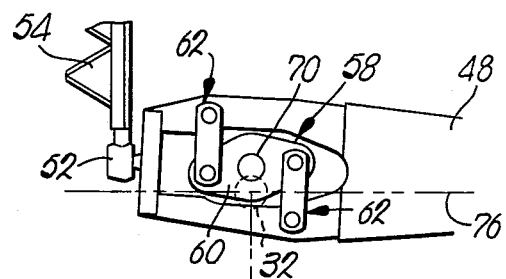
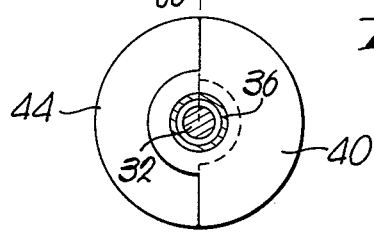
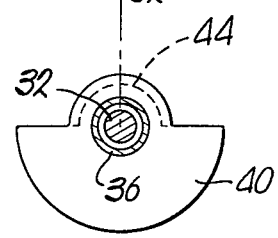
*Fig.9.*

BALANCED SICKLE DRIVE

This invention relates to the reduction of mechanically destructive and physically jarring vibrational forces which are normally induced in mechanisms that translate rotary motion from a drive shaft into reciprocal motion of a heavy member such as, for example, the sickle of the implement header.

The problem of reducing vibrations caused by abrupt changes in direction of a rapidly reciprocating, heavy member at opposite ends of its stroke has existed for a long time. It is known, for example, from U.S. Pat. No. 2,428,924, issued to V. N. Albertson on Oct. 14, 1947, to utilize a pair of superimposed, oppositely rotating counterweights which are driven to timed relationship to reciprocation of a sickle in such a manner that the weights counterbalance the inertia forces at opposite ends of the sickle stroke. The weights are so arranged that when the sickle reaches one end of its stroke with its inertia forces headed in one direction, the inertia forces of the rotating weights are headed in the opposite direction so that a balancing of forces occurs. Hence, vibrations are materially reduced.

However, the mechanism of the aforesaid Patent, as well as many other sickle drive mechanisms of which we are aware, utilizes a single, relatively short, pitman rod to translate rotary motion from the drive shaft of the mechanism into reciprocal motion of the sickle, and, as is well known, a short pitman rod cannot reciprocate a driven member so that its velocity varies sinusoidally over the full stroke. Instead, the member driven by a short pitman rod must stop and start more abruptly at one end of its stroke than at the opposite end, and this results in the inertia loading being different at opposite ends of the stroke. Accordingly, the member cannot be readily counterbalanced because the weights utilized must be based upon an average of the two different inertia loadings, not the exact amount of either loading.

The problem of the single short pitman could be solved by merely extending the pitman to such a length that the angle through which it moved during operation would be very small. Then the variance in velocity over the full stroke would approach sinusoidal and the inertia loadings at opposite ends of the stroke would approximately equal one another.

However, as a practical measure, such an arrangement is not possible on an implement header, for example, because the long pitman, disposed at one end of the sickle, might extend well beyond the lateral extremes of the header itself, presenting a dangerous, unwieldy, and easily damaged appendage to the header.

Accordingly, one important object of the present invention is to eliminate unequal inertia loading at opposite ends of the stroke of a pitman-reciprocated member whereby such loading can be readily counterbalanced by appropriately driven weights in order to provide smooth, substantially vibration-free operation.

Another important object of this invention is to provide such a remedy without producing a cumbersome apparatus subject to frequent mechanical breakdown and hazardous to personal safety.

Pursuant to the foregoing, an additional important object of the present invention is to provide a pair of short pitmans extending oppositely from an eccentrically driven component and connected to a common member to be reciprocated so that the two pitmans counteract the negative effects of one another while maintaining their positive effects in order to closely approach reciprocation of their common driven member sinusoidally.

OTHER RELATED ART

*Elements of Mechanism* by Doughti and James, 1954, Library of Congress catalogue card number 54-7373, page 149.

In the drawings:

FIG. 1 is a fragmentary, side elevational view of a sickle drive on an implement header employing the principles of the present invention;

FIG. 2 is a cross-sectional view through the drive taken along irregular line 2—2 of FIG. 1;

FIG. 3 is an enlarged, front, vertical cross-sectional view through the gearbox of the drive showing the counterbalance weights thereof in position to counteract the sickle when it is at the left end of its stroke as viewed from the front of the header, the linkage below the counterweights being rotated 90° out of position to illustrate details of construction;

FIG. 4 is a horizontal cross-sectional view through the apparatus of FIG. 3 looking downwardly from just above the counterweights when the latter are rotated into diametrically opposed relationship;

FIG. 5 is a horizontal cross-sectional view through the apparatus of FIG. 3 looking upwardly toward the bottom of the counterweights from a point just above the linkage and with the weights rotated into the positions illustrated in FIG. 4;

Figure 10:
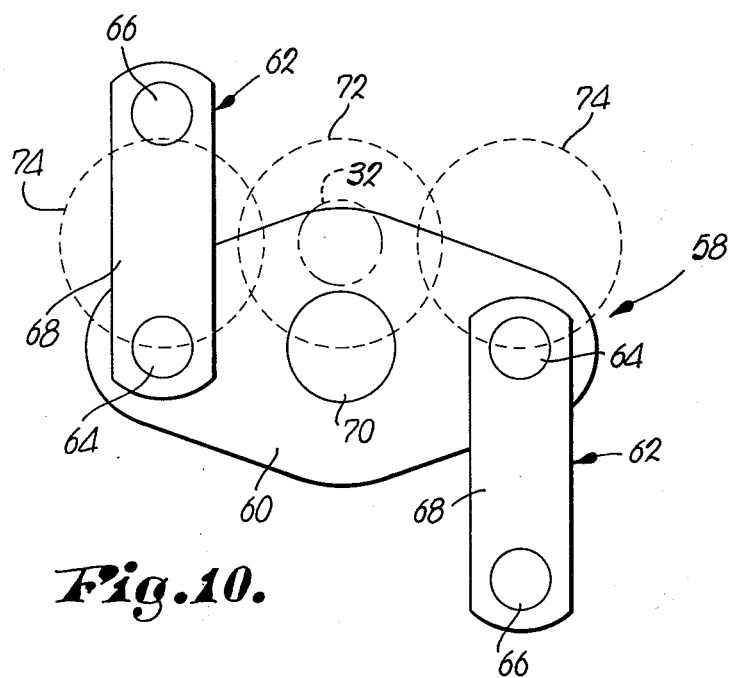
Figure 11:
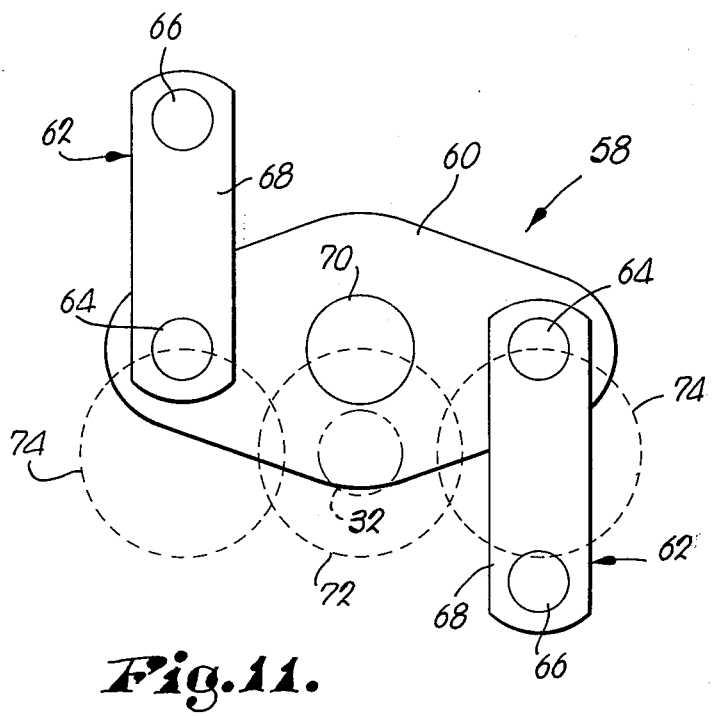

FIGS. 6 – 9 are schematic and diagrammatic views of the drive illustrating the motions of the various components involved with their positions relative to the counterweights at corresponding points in the operating cycle; and FIGS. 10 and 11 are diagrammatic views of the special drive linkage of the present invention illustrating the relationship of the pitman links to one another at opposite ends of the sickle stroke and showing in dashed lines the respective paths of travel of the links during each operating cycle.

The principles of the present invention, while applicable to any situation wherein a member is to be driven reciprocably, have been illustrated in conjunction with the sickle assembly of an implement header 10. A shaft 12 (FIG. 2) extending across the rear of header 10, is coupled at one end with a prime mover (not shown) and has a large sheave 14 attached to its other end. The sheave 14 carries an endless belt 16 that extends fore and aft along one side of header 10 and is looped about a generally cone-shaped sheave 18 for driving the latter in the same direction as shaft 12. An idler 20 along the lower stretch of belt 16 tensions the latter.

As shown best in FIG. 3, the sheave 18 has a driven shaft 22 that extends into a gearbox 24 wherein a first bevel gear 26 on shaft 22 meshes with a pair of opposed second and third bevel gears 28 and 30 respectively that rotate about a common axis perpendicular to shaft 22. Gear 28 is keyed to a generally upright drive shaft 32 extending centrally through gearbox 24 so that rotation of gear 28 in one direction by input shaft 22 is imparted to the upright drive shaft 32. On the other hand, the other bevel gear 30 associated with drive shaft 32 is provided with bearings 34 around shaft 32 that enable the gear 30 to rotate in the opposite direction and relative to shaft 32, such being caused by bevel gear 26 on input shaft 22.

A sleeve 36 at the bottom of gearbox 24 surrounds drive shaft 32 and is fixed to the gear 30 for rotation therewith in a direction opposite to shaft 32. Bearings 38 between sleeve 36 and shaft 32 permit such relative rotation. The sleeve 36 has a generally semicircular weight 40 secured thereto by a series of screws 42 so that weight 40 rotates with sleeve 36 during operation. A second, generally semicircular weight 44 is secured by a series of screws 46 to the enlarged, lowermost end of drive shaft 32 in underlying relationship to the upper weight 40 so that weight 44 rotates with drive shaft 32 during operation and in a direction opposite to weight 40.

The weights 40 and 44 are so positioned on their respective mounting means that, during operation, they come into vertically aligned relationship with one another when they are in their rightmost positions viewing FIG. 3, and also when they are in their leftmost positions viewing FIG. 3. On the other hand, they are spaced apart to the greatest extent when aligned fore-and-aft of header 10 as illustrated in FIG. 1.

Returning to FIGS. 1 and 2, a member 48, commonly known as a sway bar, extends generally fore-and-aft of header 10 along the side thereof and is swingably mounted at its rearmost end by a pivot 50 for reciprocal or oscillatory movement in a path extending generally transversely of the normal path of advancement of header 10. The member 48 extends forwardly from pivot 50 beneath gearbox 24 and has a ball-joint coupling 52 at its forwardmost end with a sickle 54 supported by header 10 for reciprocation transversely of the path of advancement of header 10.

The member 48 is provided with an elongated opening 56 adjacent its forwardmost end that provides clearance for the special linkage 58 which drivingly couples member 48 with gearbox 24. Linkage 58 includes a generally elliptical main component 60 that is carried within opening 56 by a pair of spaced-apart, oppositely extending, identical pitman links 62, each of which has a first pivot 64 with component 60 and a second pivot 66 with the member 48 on opposite sides of opening 56. Both links 62 are of the same length and each consists of a pair of superimposed elements 68 separated by pivots 64 and 66 as illustrated in FIG. 3.

The center of component 60 pivotally carries a drive stud 70 that is, in turn, fixed to the lower weight 44 in eccentric relationship to the drive shaft 32, all as best illustrated in FIG. 3. In this manner, the component 60 is drivingly coupled with shaft 32.

OPERATION

As the drive shaft 32 is rotated, the eccentrically disposed stud 70 pulls the component 60 in an orbital path about the axis of drive shaft 32 counterclockwise as FIGS. 6 – 9 are viewed. However, the pitman links 62 limit component 60 to a purely rectilinear reciprocal path of travel relative to member 48 within opening 56 and, therefore, a resultant force is created which swings the member 48 from side-to-side about pivot 50. This reciprocal swinging or oscillation of member 48 is in turn transmitted to the sickle 54 through coupling 52 to drive sickle 54 back and forth across the normal path of advancement of header 10 for severing a standing crop.

Turning to FIGS. 10 and 11, it may be seen that because the stud 70 moves in a circular path of travel 72 about the axis of shaft 32 during operation, the ends of the pitman links 62 at pivots 64 are caused to move in their own individual circular paths of travel 74. Taking the left pitman link 62 in FIGS. 10 and 11 as an example, and assuming for the moment that the right link 62 is not being utilized, it will be seen that the link 62 moves through two extreme conditions corresponding to the opposite ends of the sickle stroke, the linkage 58 being shown in FIG. 10 with the sickle at one end of its stroke and in FIG. 11 with the sickle at the opposite end of its stroke.

More specifically, the left link 62 is shown in FIG. 10 extending completely across its path of travel 74, representing one extreme condition, while the left link 62 is illustrated in FIG. 11 as approaching its path 74 and disposed primarily outside of the latter, this being the other extreme of the link 62. Because pivot 66 of the left link 62 is the point at which force is transmitted from linkage 58 to member 48 and such point moves generally in a straight line toward and away from the side of header 10 as the component 60 orbits about the axis of shaft 32, the link 62 swings back and forth through an angle (as shown in FIGS. 6 and 8) while its pivot 64 moves about path 74. Because of this geometry, the pivot 66 stops and starts more abruptly as left link 62 approaches and leaves the condition illustrated in FIG. 11 than when it approaches and leaves the condition illustrated in FIG. 10. Hence, the driving force imparted to the member 48 by the pivot 66 is different as the member 48 approaches its opposite extremes, resulting in a tendency to make the inertia loading of sickle 54 different at the opposite ends of its stroke.

This behavior is inherent in drives where a short pitman is utilized to transmit rotary motion from a crank into reciprocal motion of another member. Because the short pitman must swing back and forth through a substantial angle during actuation by the rotary crank, the driving end of the pitman inherently has a "fast" extreme and a "slow" extreme, the pivot 66 of left link 62 being in its "slow" extreme in FIG. 10 and in its "fast" extreme in FIG. 11.

The inherent deficiencies of a single short pitman, such as the left link 62 of FIGS. 10 and 11, can be overcome by the addition of a second short pitman link which is so arranged that its driving end is moved through its fast extreme while the driving end of the first link is moving through its slow extreme, and vice versa. Thus, the right link 62 of FIGS. 10 and 11, while seemingly at the same point in its path 74 as the left link 62 is on its path 74, is actually disposed to move its pivot 66 through the fast portion of its cycle while the left link 62 moves its pivot 66 through its slow portion. Therefore, when pivot 66 of the left link 62, for example, begins to slow down, the "slack" is picked up by the pivot 66 of the right link 62, which is just beginning to speed up, the result being that the member 48, and hence the sickle 54, has the same rate of acceleration and deceleration through both halves of its stroke. This means that the velocity of sickle 54 will vary substantially sinusoidally, causing the inertia loading at one end of the sickle stroke to be equal to that at the opposite end. Hence, the inertia loading can then be readily counterbalanced through the weights 40 and 44, whose sequence of operation relative to the linkage 58 may be most easily understood by referring to FIGS. 6 – 9.

Beginning in FIG. 6, the weights 40 and 44 are disposed at opposite fore-and-aft extremes in order to cancel out one another when member 48 is in mid-stroke, such median position being illustrated by the broken line 76. When the member 48 is shifted to its rightmost extreme, viewing the front of header 10, the weights 40 and 44 are disposed in superposition with one another at their leftmost extreme (viewing the front of the header 10) as illustrated in FIG. 7. Thus, the weights 40 and 44 supply a leftwardly directed inertia loading of their own that cancels out the rightwardly directed inertia loading of member 44 and sickle 54.

Then as the member 48 and sickle 54 are returned to midstroke as illustrated in FIG. 8, the weights 40 and 44 are again separated fore-and-aft of header 10 to balance out each other and not supply any resultant inertia loading.

Finally, when the member 48 and sickle 54 reach the opposite extreme of FIG. 9, wherein sickle 54 is in its leftmost extreme viewing the front of header 10, the weights 40 and 44 are brought into superposition in their rightmost extreme viewing the front of header 10 to supply a rightwardly directed inertia force which cancels out the leftwardly directed inertia force of member 48 and sickle 54.

Thus, the result of the special linkage 58 and weights 40 and 44 is a smoothly operating, well-balanced and substantially vibration-free sickle drive that materially reduces the likelihood of mechanical failure caused by induced vibrations. Moreover, the drive is relatively compact and allows higher operating speeds to be achieved than heretofore possible without the usual vibrations and shaking which normally accompany such higher speeds.

Having thus described the invention, what is claimed as new and desired to be secured by Letters Patent is:

1. In apparatus for translating rotary motion into reciprocal motion:
   a rotary drive shaft;
   a single component eccentrically coupled with said shaft for orbital movement about the axis of the shaft when the latter is rotated,
   said component being pivotal about a second axis during said orbiting movement;
   a reciprocable member; and
   structure coupling said member with said component,
   said structure being pivotally connected to said component at a pair of spaced points on opposite sides of said second axis for reciprocating the member during rotation of said shaft.

2. In apparatus as claimed in claim 1, wherein said structure is disposed to limit said component to its own rectilinear path of reciprocation relative to said member during rotation of said shaft.

3. In apparatus as claimed in claim 2, wherein said path of the component is transverse to the path of the member.

4. In apparatus as claimed in claim 3, wherein said structure includes a pair of swingable connectors between said member and the component on opposite sides of said second axis.

5. In apparatus as claimed in claim 4, wherein said connectors extend in opposite directions from said component.

6. In apparatus as claimed in claim 5, wherein said member is provided with an opening, said connectors disposing said component for reciprocation within said opening.

7. In apparatus for translating rotary motion into reciprocal motion:
   a rotary drive shaft;
   a reciprocable member;
   a single component coupled with said member in a manner to limit movement of the component relative to the member to rectilinear reciprocation transversely of the path of travel of the member; and
   means eccentrically and pivotally coupling said component with the shaft for orbital movement about the axis of the shaft when the latter is rotated, whereby to drive said member along said path.

8. In apparatus as claimed in claim 7, wherein said member is coupled with said component on opposite sides of the pivotal axis of the component.

9. In apparatus as claimed in claim 8, wherein said component is provided with a pair of oppositely extending, swingable connectors on opposite sides of its pivotal axis and joining the component with said member.

10. In apparatus as claimed in claim 9, wherein said member is provided with a sickle for reciprocating the latter during reciprocation of the member.

11. In apparatus as claimed in claim 10, wherein said member is swingable along said path about an axis spaced from said sickle.

12. In apparatus as claimed in claim 11, wherein said shaft is provided with a pair of superimposed counterbalance elements, one of said elements being rotatable with the shaft in one direction and the other being rotatable relative to the shaft in the opposite direction, and means for driving the elements in their respective directions and in timed relationship to reciprocation of said sickle for counterbalancing inertia forces of the sickle at opposite ends of its stroke.

13. In apparatus for translating rotary motion into reciprocal motion:
   a single component;
   means coupled with said component for driving the same in a circular path of travel;
   a reciprocable member; and
   a pair of spaced apart, substantially equal length pitman links extending in opposite directions from said component and coupling the latter with said member for reciprocating the member with substantially equal acceleration and deceleration adjacent opposite ends of its path of travel upon actuation of said driving means.

14. In apparatus as claimed in claim 13, wherein said driving means includes a shaft, said component being eccentrically coupled with the shaft for orbiting movement about the axis of the shaft when the latter is actuated.

15. In apparatus as claimed in claim 14, wherein said component is pivotally coupled with said shaft, said pitman links being disposed on opposite sides of the pivotal axis of said component.

16. In apparatus as claimed in claim 15, wherein said member is provided with an opening receiving said component for reciprocation thereof transversely of the path of travel of said member.

17. In apparatus as claimed in claim 13, wherein said driving means includes a shaft and said member is provided with a sickle for reciprocation by the member, said member being mounted for swinging movement about an axis spaced from said sickle.

18. In apparatus as claimed in claim 17, wherein said sickle is disposed at one end of said member and said swinging axis of the member is disposed at the opposite end of the latter.

19. An apparatus as claimed in claim 17, wherein said shaft is provided with a pair of superimposed counterbalance elements, one of which is rotatable with the shaft in one direction and the other of which is rotatable relative to the shaft in the opposite direction; and means for driving the elements in their respective directions and in timed relationship to reciprocation of said sickle for counterbalancing inertia forces of the latter adjacent opposite ends of its stroke.

* * * * *